(12) United States Patent
Abdelnur et al.

(10) Patent No.: US 8,181,178 B2
(45) Date of Patent: May 15, 2012

(54) ONLINE BATCH EXECUTION

(75) Inventors: Alejandro Abdelnur, Bangalore (IN); Abhijit Bagri, Asansol (IN); Ravikiran Meka, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 944 days.

(21) Appl. No.: 12/192,106

(22) Filed: Aug. 14, 2008

(65) Prior Publication Data

US 2010/0042998 A1 Feb. 18, 2010

(51) Int. Cl.
*G06F 9/46* (2006.01)
(52) U.S. Cl. ..................................................... 718/101
(58) Field of Classification Search .................. None
See application file for complete search history.

(56) References Cited

U.S. PATENT DOCUMENTS

| | | | | |
|---|---|---|---|---|
| 2003/0023707 A1* | 1/2003 | Ryan | ............................. | 709/220 |
| 2006/0179042 A1* | 8/2006 | Bram et al. | ....................... | 707/3 |
| 2008/0183800 A1* | 7/2008 | Herzog et al. | ................ | 709/202 |
| 2009/0183156 A1* | 7/2009 | Day et al. | ....................... | 718/100 |

* cited by examiner

*Primary Examiner* — Jacob A Petranek
(74) *Attorney, Agent, or Firm* — Evergreen Valley Law Group, P.C.; Kanika Radhakrishnan (57) ABSTRACT

Online batch processing. A job request is received from a user for processing. The job request includes a job configuration and a plurality of operations to process the data. The job configuration is extracted from the job request and stored in a configuration cache. A metadata configuration code is extracted from the job configuration and stored in a code cache. A runtime configuration code is extracted from the job configuration and stored in an instance cache. This allows information to be obtained from the configuration cache, the code cache and the instance cache for processing subsequent job requests with the similar job configuration and the plurality of operations. The data is fetched from at least one of the job request and an external storage device. The plurality of operations is executed on the data to generate a result. The result is provided to the user through at least one of an output stream and the external storage device.

18 Claims, 7 Drawing Sheets

ONLINE BATCH EXECUTION

BACKGROUND

A batch system typically processes data in several processing units and combines the results to produce the desired output. In certain cases, data received for processing consists of small volumes of data. In this scenario, processing is accomplished in either of two methods.

The first existing method includes processing these small volumes of data using the same batch software on the same large computer systems as used for large volumes of data. Using a batch system to process a small volume of data is inefficient because the initialization and startup times are fixed regardless of the volume of data. As the volume of data becomes smaller, the proportion of time that is devoted to startup becomes relatively larger. Also, large system resources are tied up but not fully utilized.

The second existing method includes writing new software that will perform the same operations of a batch system for small volumes of data on small systems. However, there is a significant amount of time and expense involved in writing this new software.

A decision of using one of the existing two methods is made at the time of designing the computer system. However, the decision making is not possible as the volume of the data may not be pre-determined in all circumstances.

In light of the foregoing discussion, there is a need for enabling both batch execution and online execution on a computer system.

SUMMARY

Embodiments of the invention described herein provide a method, system and non-transitory machine-readable medium for data processing.

A method for processing data includes receiving a job request from a user. The job request comprises a job configuration and a plurality of operations to process the data. The job configuration is extracted from the job request and is stored in a configuration cache. A metadata configuration code is also extracted from the job configuration and is stored in a code cache. A runtime configuration code is extracted from the job configuration and is stored in an instance cache. This enables information to be obtained from the configuration cache, the code cache and the instance cache for processing subsequent job requests with the similar job configuration and the plurality of operations. The data is fetched from at least one of the job request and an external storage device. This enables interoperability between batch execution and online execution. The plurality of operations is executed on the data to generate a result. The result is provided to the user through at least one of an output stream and the external storage device.

An example system includes a computer that runs batch software in an on-line mode. The computer comprises a central processor. Further, the computer comprises a random-access memory. The random-access memory includes a configuration cache, a code cache and an instance cache. The computer also comprises an input device which communicates to the central processor. A software is stored in the random-access memory. This operates the central processor to extract a metadata configuration and a runtime configuration from the job request and store both configurations in the configuration cache. The metadata configuration code is also extracted from the job request and stored in the code cache. The runtime configuration code is extracted from the job request and stored in the instance cache. Further, any data is received in the job request and any data is received from an external data storage device and the received data is processed to output data according to code stored in the code and instance caches. The computer also comprises an output device in communication with the central processor, through which the output data can be communicated to a user.

DETAILED DESCRIPTION OF THE EMBODIMENTS

In various embodiments of the invention, "device" is a system that generates a job request and corresponding data for processing. A "server" is a computer system programmed and configured to manage data flow amongst other computers. The data may be in various formats. Examples of the formats include but are not limited to, comma separated values (CSV) format, tab separated values (TSV) format, hyper text mark-up language (HTML) format, extensible mark-up language (XML) format, and really simple syndication (RSS) format. "Result" is data that is delivered to a device after required operations have been performed on the data received.

Figure 1:
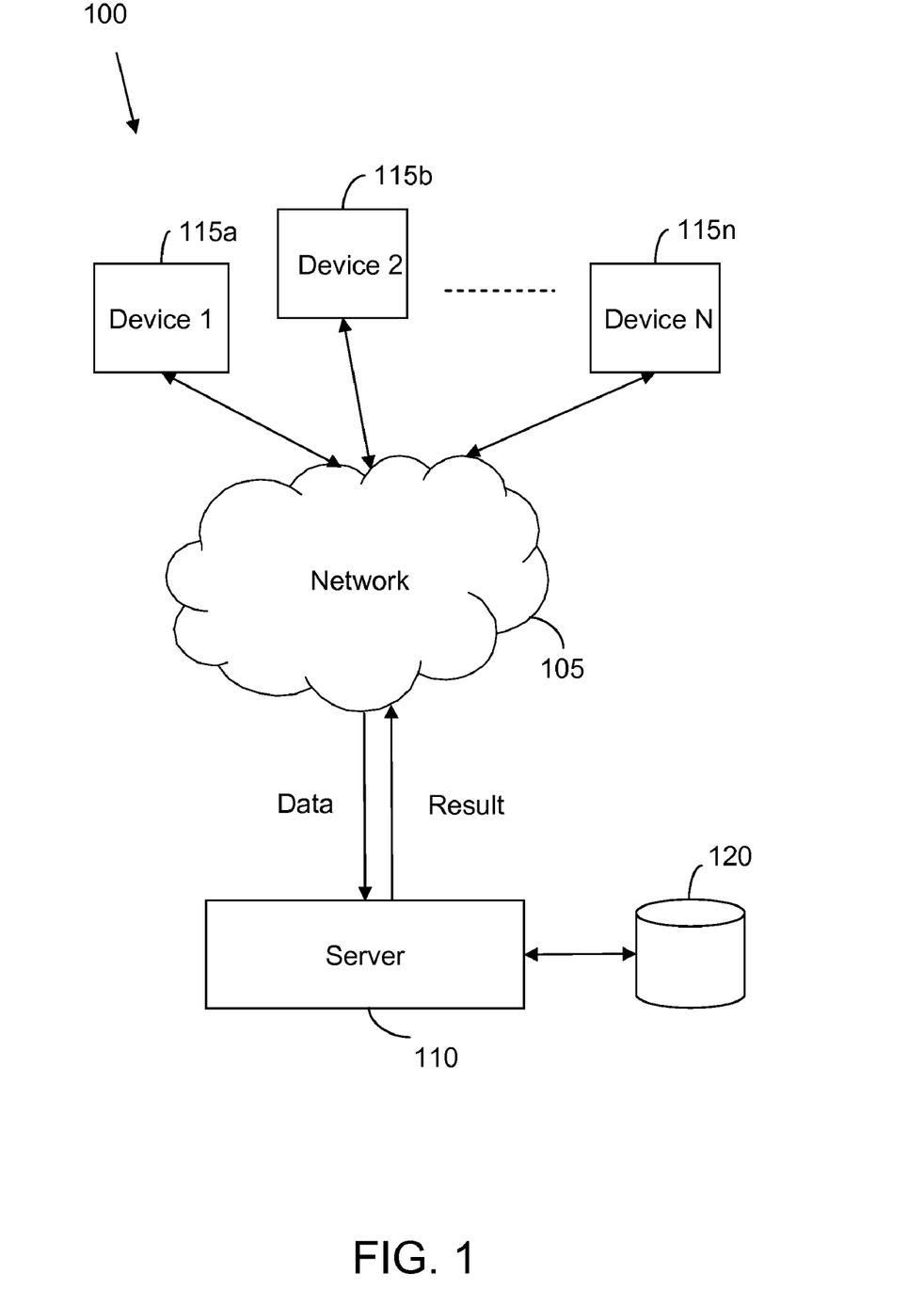
FIG. 1 is a block diagram of a computer environment in which the invention may be practiced.

FIG. 1 is a block diagram of a computer environment in which the invention may be practiced. Environment 100 includes one or more devices, for example, device 115a, device 115b and device 115n connected to each other through a network 105. The devices are also connected to a server 110 through the network 105. Server 110 is connected to an external storage device 120.

An example of an external storage device includes but is not limited to a distributed storage device.

Examples of devices include but are not limited to computers, laptops, mobile devices, data processing units, computing devices, hand held devices, and personal digital assistants (PDAs). Examples of network 105 include but are not limited to a Local Area Network (LAN), a Wireless Local Area Network (WLAN), a Wide Area Network (WAN), and a Small Area Network (SAN).

Examples of data include but are not limited to news records, sports records, weather records, web log records and libraries.

In an embodiment, a device, for example device 115a, sends a job request to server 110 through network 105. Data may accompany the job request, or the server 110 may retrieve data from the external storage device 120. The server 110 processes the data and returns the result to network 105.

In an embodiment of the invention, the server 110 includes a web application for receiving job requests.

In an embodiment of the invention, the result is stored into the external storage device 120. A system for processing the data is explained in detail in conjunction with FIG. 2.

Figure 2:
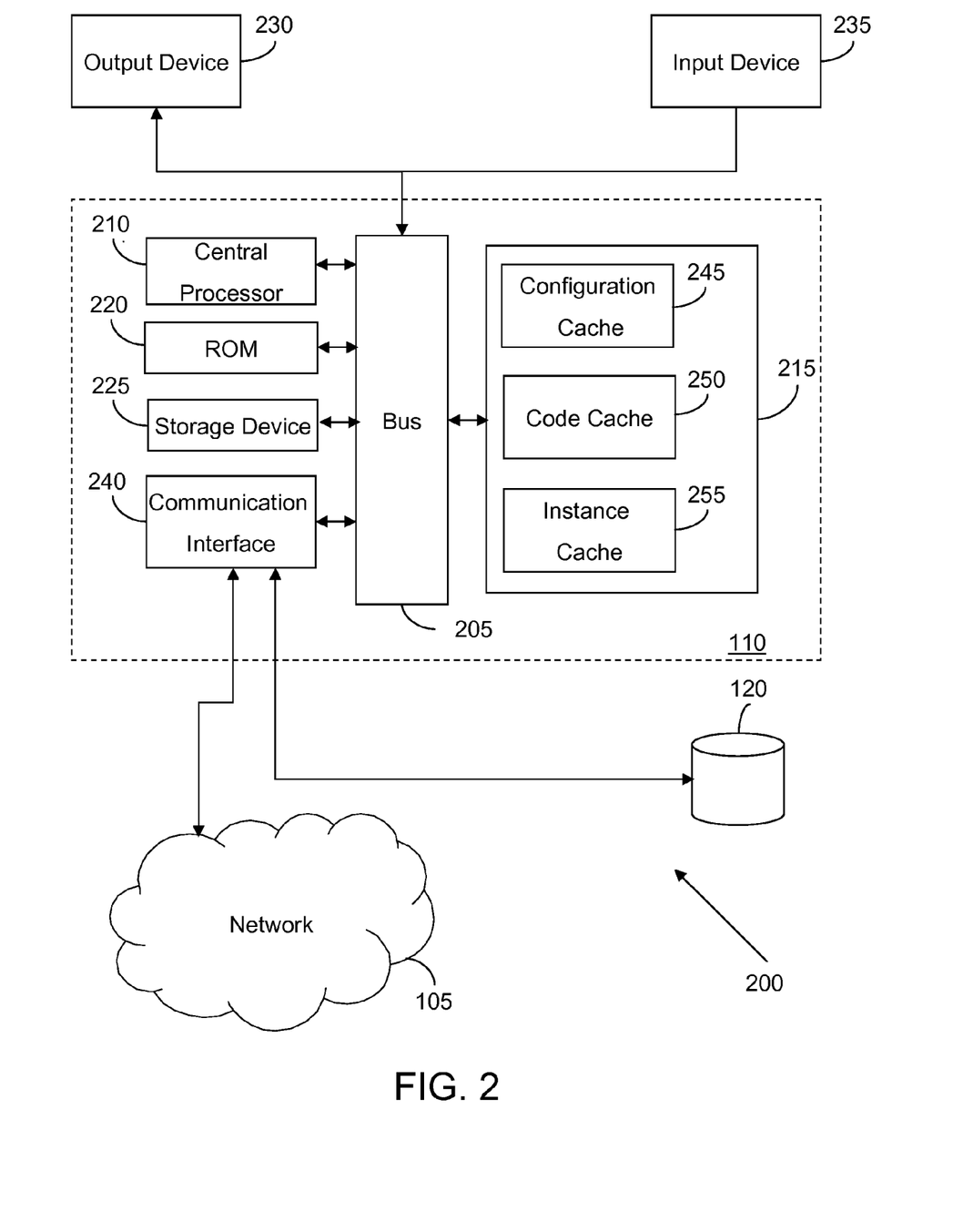
FIG. 2 is a block diagram of a computer system in which various embodiments may be implemented.

FIG. 2 is a block diagram of a computer system 200 in which various embodiments may be implemented. Computer system 200 includes a server 110. Server 110 includes a bus 205 or other communication mechanism for communicating information, and a central processor 210 coupled with bus 205 for processing information. Server 110 also includes a main memory 215, such as a random-access memory (RAM) or other dynamic storage device, coupled to bus 205 for storing information and instructions to be executed by central processor 210. Main memory 215 may be used for storing temporary variables or other intermediate information during execution of instructions to be executed by central processor 210. Main memory 215 also includes a configuration cache 245, a code cache 250 and an instance cache 255. The configuration cache 245 is used for storing job configurations of all job requests. The code cache 250 is used for storing a metadata configuration code extracted from the job configuration. The instance cache 255 is used for storing a runtime configuration code extracted from the job configuration. Server 110 further includes a read only memory (ROM) 220 or other static storage device coupled to bus 205 for storing static information and instructions for central processor 210. A storage device 225, such as a magnetic disk or optical disk, is provided and coupled to bus 205 for storing information and instructions.

Server 110 may be coupled via bus 205 to an output device 230, such as a cathode ray tube (CRT), for displaying a result to a computer user. An input device 235, such as alphanumeric and other keys, is coupled to bus 205 for communicating information and command selections to central processor 210.

Embodiments of the invention are related to the use of server 110 for implementing the techniques described herein. In an embodiment of the invention, the techniques are performed by server 110 in response to central processor 210 executing instructions included in main memory 215. Such instructions may be read into main memory 215 from another machine-readable medium, such as storage device 225. Execution of the instructions included in main memory 215 causes central processor 210 to perform the process steps described herein. In alternative embodiments, hard-wired circuitry may be used in place of or in combination with software instructions to implement the embodiments of the invention.

The term "machine-readable medium" as used herein refers to any physical medium for storing computer instructions and is carried by the physical medium that causes a machine to be operable in a specific fashion.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, or any other memory chip or cartridge, Various forms of machine-readable medium may be involved in carrying instructions to central processor 210 for execution. For example, the instructions may initially be carried on a magnetic disk of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal and appropriate circuitry can place the data on bus 205. Bus 205 carries the data to main memory 215, from which central processor 210 retrieves and executes the instructions. The instructions received by main memory 215 may optionally be stored on storage device 225 either before or after execution by central processor 210.

Server 110 also includes a communication interface 240 coupled to bus 205. Communication interface 240 provides a two-way data communication coupling to a network 105. For example, communication interface 240 may be an integrated services digital network (ISDN) card or a modem to provide a data communication connection to a corresponding type of telephone line. As another example, communication interface 240 may be a local area network (LAN) card to provide a data communication connection to a compatible LAN. Wireless links may also be implemented. In any such implementation, communication interface 240 sends and receives electrical, electromagnetic or optical signals that carry digital data streams representing various types of information.

Server 110 can send messages and receive data, including program code, through network 105 and communication interface 240. Server 110 may also fetch data from an external storage device 120.

The code may be executed by central processor 210 as received, or stored in storage device 225, or other non-volatile storage for later execution.

In an embodiment, the data is processed in an online stream by central processor 210. The method is explained in detail in conjunction with FIGS. 3a and 3b.

Figure 3A:
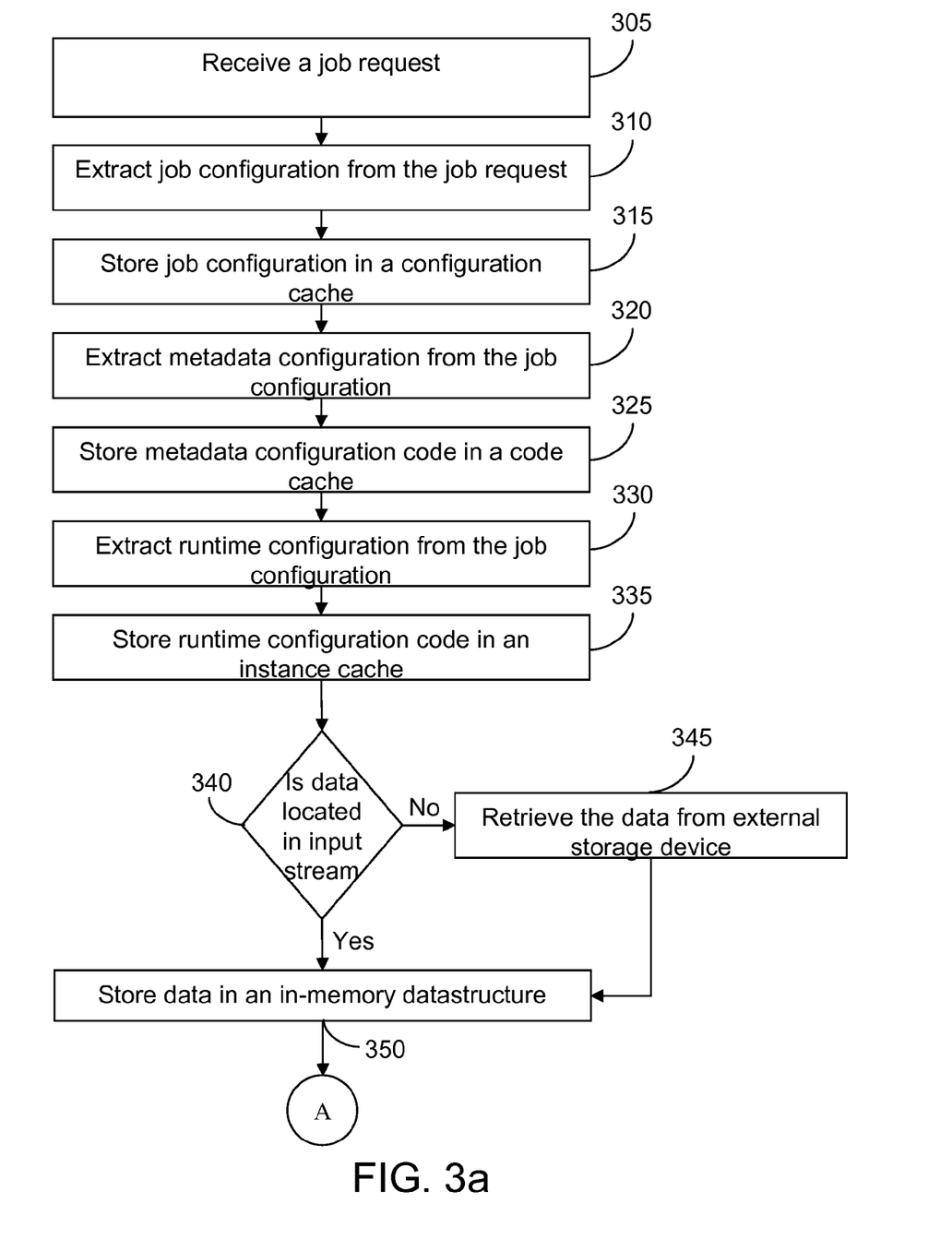
FIGS. 3a and 3b are flow diagrams illustrating a method for data processing.
Figure 3B:
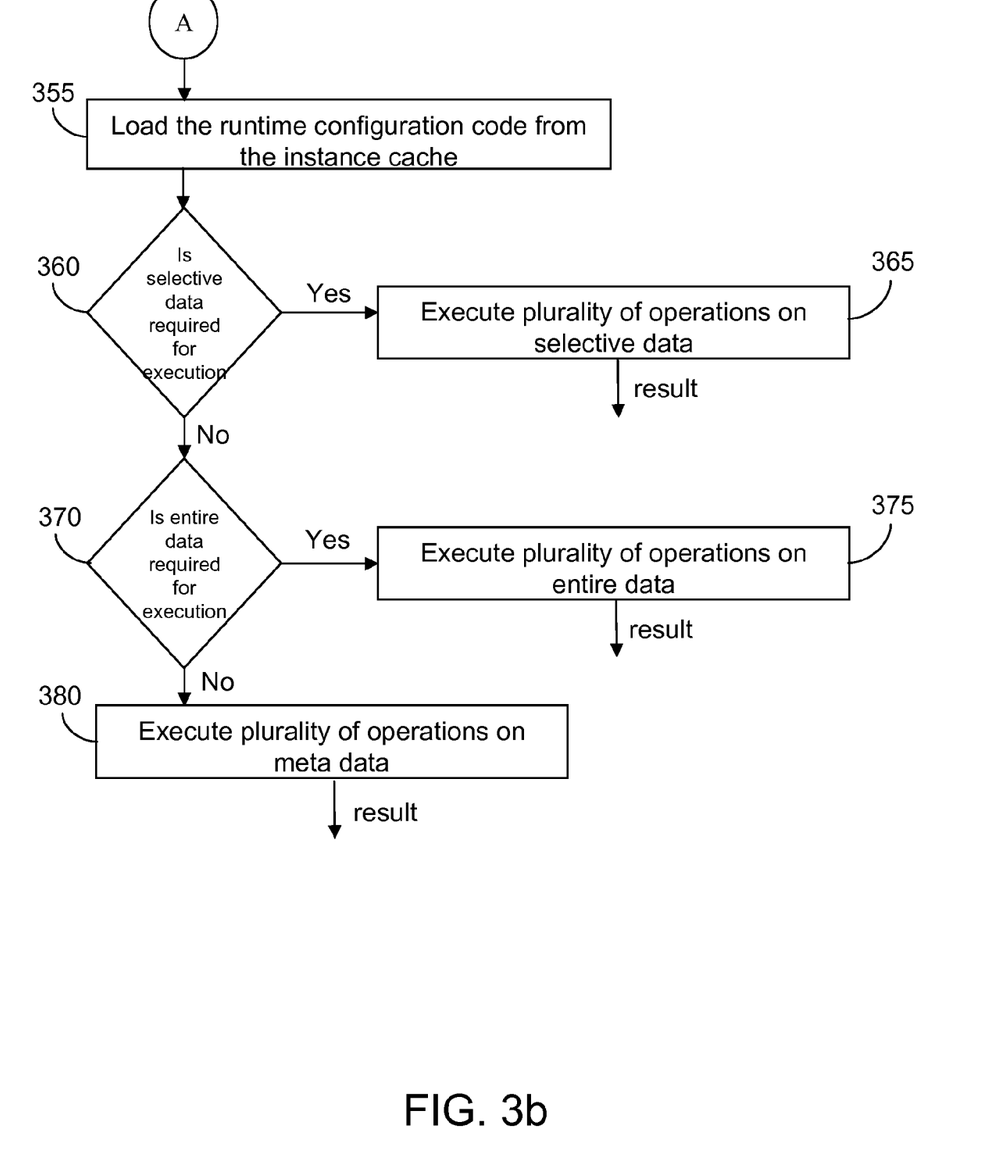

FIGS. 3a and 3b are flow diagrams illustrating a method for data processing.

The data can be processed by batch execution or on-line based on the volume of the data, in some embodiments both alternatives may be carried out on the same computer system. The application specifies whether the volume of the data is small or large at the time of sending the job request. Based on the volume of the data, one of the execution methods is selected. This enables interoperability between the batch execution and the online execution. The online execution method receives data in the direct input stream. The batch execution method retrieves data from the external storage device 120.

At step 305, a job request is received in a direct input stream. The job request includes job configuration. Job configuration further includes a metadata configuration and runtime configuration. The metadata configuration includes identifiers that map to corresponding part of a metadata configuration code which includes binaries and libraries required for processing the data. The runtime configuration is used to identify the runtime configuration code required for processing the data in real time.

At step 310, the job configuration of the job request is extracted. The job configuration changes for a different job request. Further, each job configuration is tagged with a job name and a signature.

At step 315, the job configuration is stored in a Configuration Cache 245.

At step 320, the metadata configuration is extracted from the job request. The metadata configuration identifies all binaries and libraries indexed by the job name required for processing the data.

At step 325, the metadata configuration code is stored in a Code Cache 250. In this manner, required libraries and binaries are available for processing subsequent job requests. Any subsequent job request that comes in with the similar job request and job configuration that was processed earlier in time may use the stored metadata configuration code from the Code Cache 250. Further, the metadata configuration remains the same for a job over all runs.

At step 330, the runtime configuration is extracted from the job request.

At step 335, the code associated with runtime configuration is stored in an Instance Cache 255. An instance of the job request is created by combining the job signature of the job configuration and the corresponding code from the Code Cache 250. The Instance Cache 255 includes the runtime configuration code of the job request and changes per run of the job.

For example, a job request can include a spell check on data. In this case a dictionary is loaded on the first run of the job request and also stored in the code cache 250. For all subsequent runs of the same job request, the metadata configuration code is available in the code cache thereby eliminating the need to load the code for each run of the job request. The time taken for loading the required code for data processing is considerably reduced by caching the code in the code cache.

The job request is run on the instance in the Instance Cache 255. This eliminates the need to read and write intermediate results through intermediate files or databases which may be otherwise time inefficient.

At step 340, a check is performed to locate the data in the direct input stream. If it is determined that the data is present in the direct input stream then step 350 is performed.

If it is determined that the data is not located in the input stream, step 345 is performed.

At step 345, data is retrieved from an external storage device 120. A job identifier tagged in the job configuration identifies the location in the external storage device for retrieving data. For example, a job request run over batch execution may include a condition to group indexes of various files. Output of the batch execution may be stored in the external storage device. If the next job request is to generate a summary, then the next job can be run on online execution. Further, the input for the next job is retrieved from the external storage device.

At step 350, the data received in the input stream or at step 345 is stored in an in-memory datastructure. The data can be metadata file. A metadata file includes the state of execution between jobs and a common description of the entire data.

Further, if the data is located in the external storage device, then it is extracted and stored in an in-memory datastructure. Similarly, if the data is received from input stream, then the stream is transformed into the same in-memory datastructure. This datastructure is then used as a common data format for processing data. Storing the data in the in-memory datastructure eliminates the need for reading and writing in files. Further, the data is processed in the in-memory datastructure enabling efficiency in execution time and memory space.

It will be appreciated that an in-memory datastructure includes but is not limited to arrays, records, unions, references, linked lists, VList, Stack, Queue, B-trees and B+trees.

At step 355, the runtime configuration code is extracted from the instance cache and is loaded in the in-memory data structure.

At step 360, a check is performed to determine if a plurality of operations is to be executed on selective data. If it is determined that selective data needs to be executed, step 365 is performed.

If it is determined that execution is not required on selective data, step 370 is performed.

At step 365, the job request is executed selectively in the in-memory datastructure. The data can include a plurality of data units. Each data unit is then selected sequentially for execution. For example, the job request can include a spell check on the data. The job request is executed on each of the plurality of data units in the in-memory datastruture. The processed data units are collectively sent in the output stream. The processed data units can be stored in the external storage device if the data was selected from the external storage device.

In one embodiment, the job request may be executed on a group of data units. The data units are grouped based on a grouping condition. For example, the job request may include capitalization on the entire data. If the data includes a considerable amount of numerals, a grouping condition to generate a first group on alphabets and second group of numerals is performed. The processing is done only on the first group to generate the result.

In one embodiment, a runtime configuration of batch execution may be the same runtime configuration required for online execution of a job request. In such situations, the same runtime configuration is used for both methods of batch execution and online execution.

At step 370, a check is performed to determine if a plurality of operations is to be executed on entire data. If it is determined that the entire data needs to be executed, step 375 is performed.

If it is determined that execution is not required on the entire data, step 380 is performed.

At step 375 the job request is executed on the complete data in the in-memory datastructure. For example, the job request can include a spell check on entire data. The processing is done on the entire data thereby eliminating the need to generate subsets.

At step 380, the job request is executed on the metadata in the in-memory datastructure.

Executing the plurality of operations at step 365, step 375 and step 380, processes the data to output a result that can be accessed by a user through at least one of an output stream and the external storage device. The result in the in-memory datastructure is serialized and sent in the output stream to the corresponding device. Further, the result can also be stored back into the external storage device if the data was selected from the external storage device.

In one embodiment, the result may be marked as probable input data for a next job request. This enables the next job request to be processed immediately without waiting for the input data to be received in the direct input stream or retrieved from the external storage device.

The instances in the Instance Cache may be destroyed after a certain period of time or at a certain threshold value of the memory.

Figure 4A:
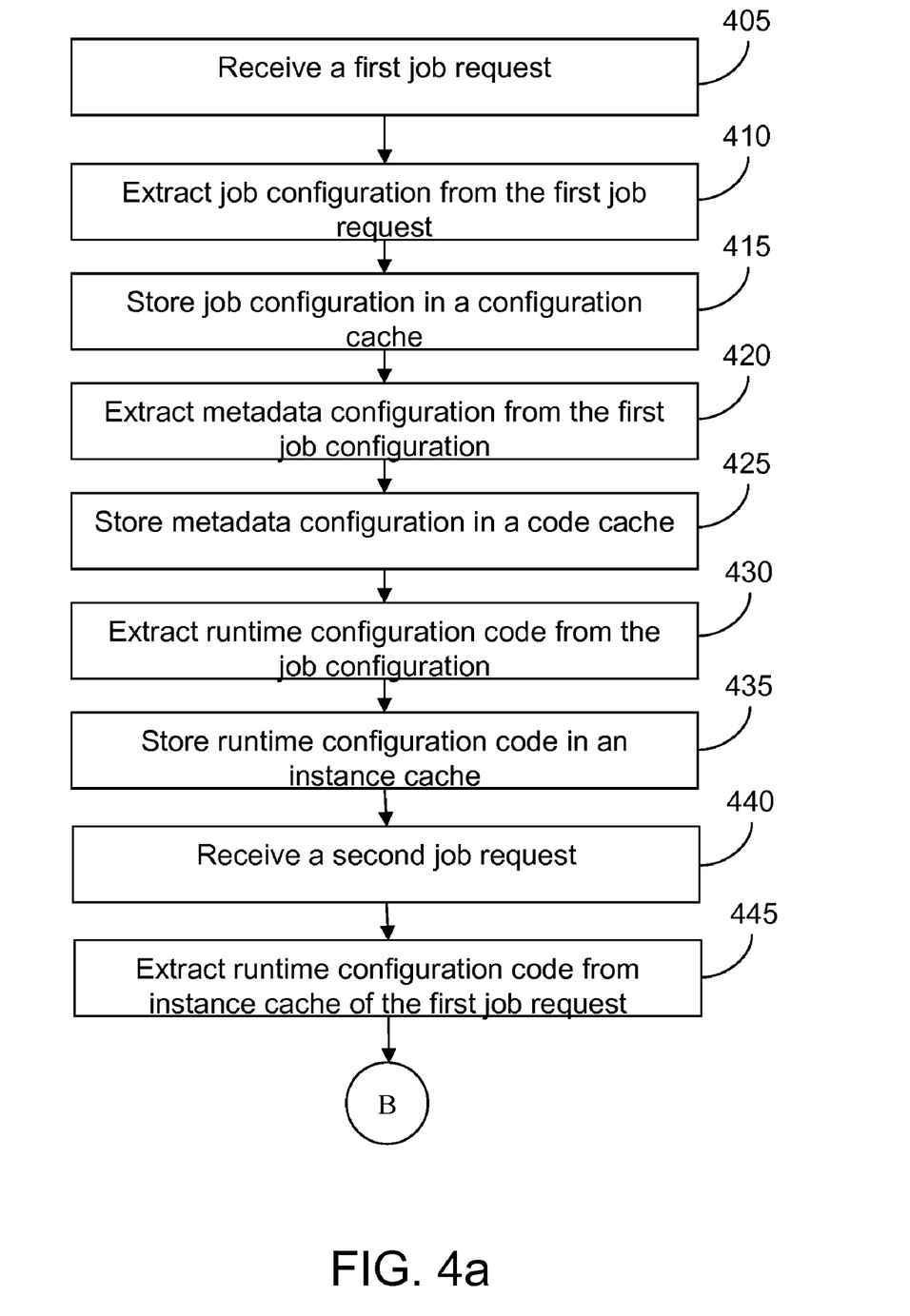
FIGS. 4a and 4b are flow diagrams illustrating a method for data processing.
Figure 4B:
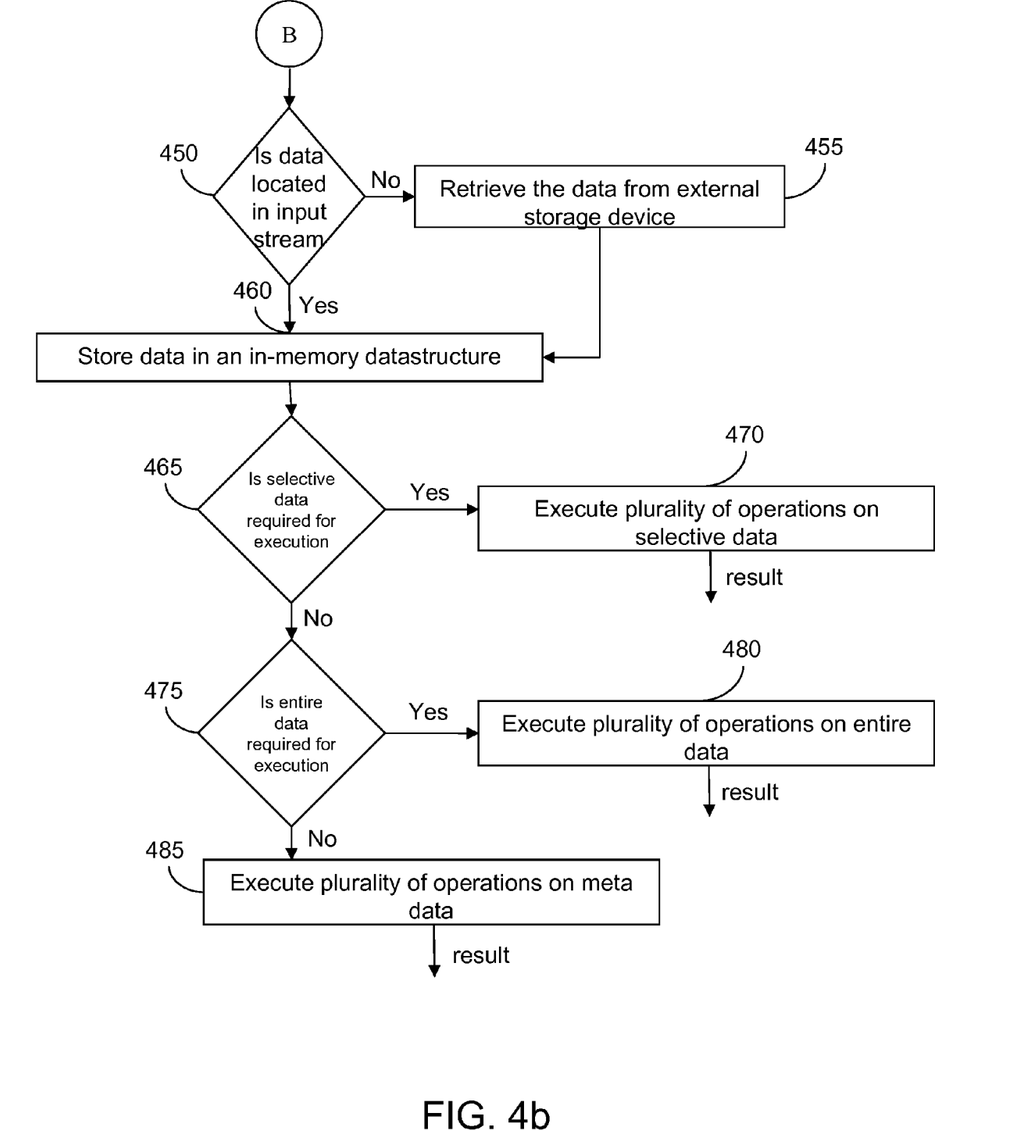

FIGS. 4a and 4b are flow diagrams illustrating a method for data processing.

At step 405, a first job request is received in an input stream. The first job request includes job configuration. Job configuration further includes a metadata configuration and runtime configuration. The metadata configuration includes identifiers that map to corresponding part of a metadata configuration code which includes binaries and libraries required for processing the data. The runtime configuration is used to identify the runtime configuration code required for processing the data in real time.

At step 410, the job configuration of the first job request is extracted. The job configuration changes for a different job request. Further, each job configuration is tagged with a job name and a signature.

At step 415 the job configuration is stored in a Configuration Cache 245.

At step 420, the metadata configuration is extracted from the first job request. The metadata configuration identifies all binaries and libraries indexed by the job name required for processing the data.

At step 425 the metadata configuration code is stored in a Code Cache 250. In this manner, required libraries and binaries are available for processing subsequent job requests. Any subsequent job request that comes in with a job request and a job configuration similar to those of the first job request may use the stored metadata configuration code from the Code Cache 250. Further, the metadata configuration remains the same for a job over all runs.

At step 430, the runtime configuration is extracted from the first job request.

At step 435 the code associated with runtime configuration is stored in an Instance Cache 255. An instance of the job request is created by combining the job signature of the job configuration and the corresponding code from the Code Cache 250. The Instance Cache 255 includes the runtime configuration code of the first job request and changes per run of the job.

At step 440 a second job request is received in an input stream. The second job request includes the same job configuration as the first job request. The job configuration further includes a metadata configuration and runtime configuration. The metadata configuration includes identifiers that map to corresponding part of a metadata configuration code which includes binaries and libraries required for processing the data. The runtime configuration is used to identify the runtime configuration code required for processing the data in real time.

At step 445 the runtime configuration code is extracted from the Instance Cache. As the job configuration of the second job request is the same as that of the first job request, the runtime configuration code of the first job request is used to process the data. This allows using the same runtime configuration code and eliminates the need to load the code for the second job request a second time.

At step 450, a check is performed to determine if the data is present in the direct input stream. If it is determined that the data is present in the direct input stream then step 460 is performed.

If it is determined that the data is not located in the input stream, step 455 is performed.

At step 455, data is retrieved from an external storage device 120. A job identifier tagged in the job configuration identifies the location in the external storage device for retrieving data.

At step 460, the data received in the input stream or at step 455 is stored in an in-memory datastructure. The data can be metadata file. A metadata file includes the state of execution between jobs and a common description of the entire data.

Further, if the data is located in the external storage device, then it is extracted and stored in an in-memory datastructure. Similarly, if the data is received from the input stream, then the stream is transformed into the same in-memory datastructure. This datastructure is then used as a common data format for processing data. Storing the data in the in-memory datastructure, in accordance with an embodiment, eliminates the need for reading and writing in files. Further, the data is processed in the in-memory datastructure enabling efficiency in execution time and memory space.

At step 465, a check is performed to determine if a plurality of operations is to be executed on selective data. If it is determined that selective data needs to be executed, step 470 is performed.

If it is determined that execution is not required on selective data, step 475 is performed.

At step 470, the second job request is executed selectively in the in-memory datastructure. The data can include a plurality of data units. Each data unit is then selected for execution. For example, the job request can include a spell check on the data. The job request is executed on each of the plurality of data units in the in-memory datastructure. The processed data units are collectively sent in the output stream. The processed data units can be stored in the external source if the data was selected from the external storage device.

In one embodiment, the job request may be executed on a group of data units. The data units are grouped based on a grouping condition. For example, the job request may include capitalization on the entire data. If the data includes a considerable amount of numerals, a grouping condition to generate a first group on alphabets and second group of numerals is performed. The processing is done only on the first group to generate the result.

At step 475, a check is performed to determine if a plurality of operations is to be executed on entire data. If it is determined that the entire data needs to be executed, step 480 is performed.

If it is determined that execution is not required on the entire data, step 485 is performed.

At step 480, the second job request is executed on the complete data in the in-memory datastructure. For example, the second job request can include a spell check on entire data. The processing is done on the entire data thereby eliminating the need to generate subsets.

At step 485, the second job request is executed on the metadata in the in-memory datastructure.

Executing the plurality of operations at step 470, step 480 and step 485, processes the data to output a result that can be accessed by a user through at least one of an output stream and the external storage device. The result in the in-memory datastructure is serialized and sent in the output stream to the corresponding device. Further, the result can also be stored back into the external storage device if the data was selected from the external storage device.

Figure 5:
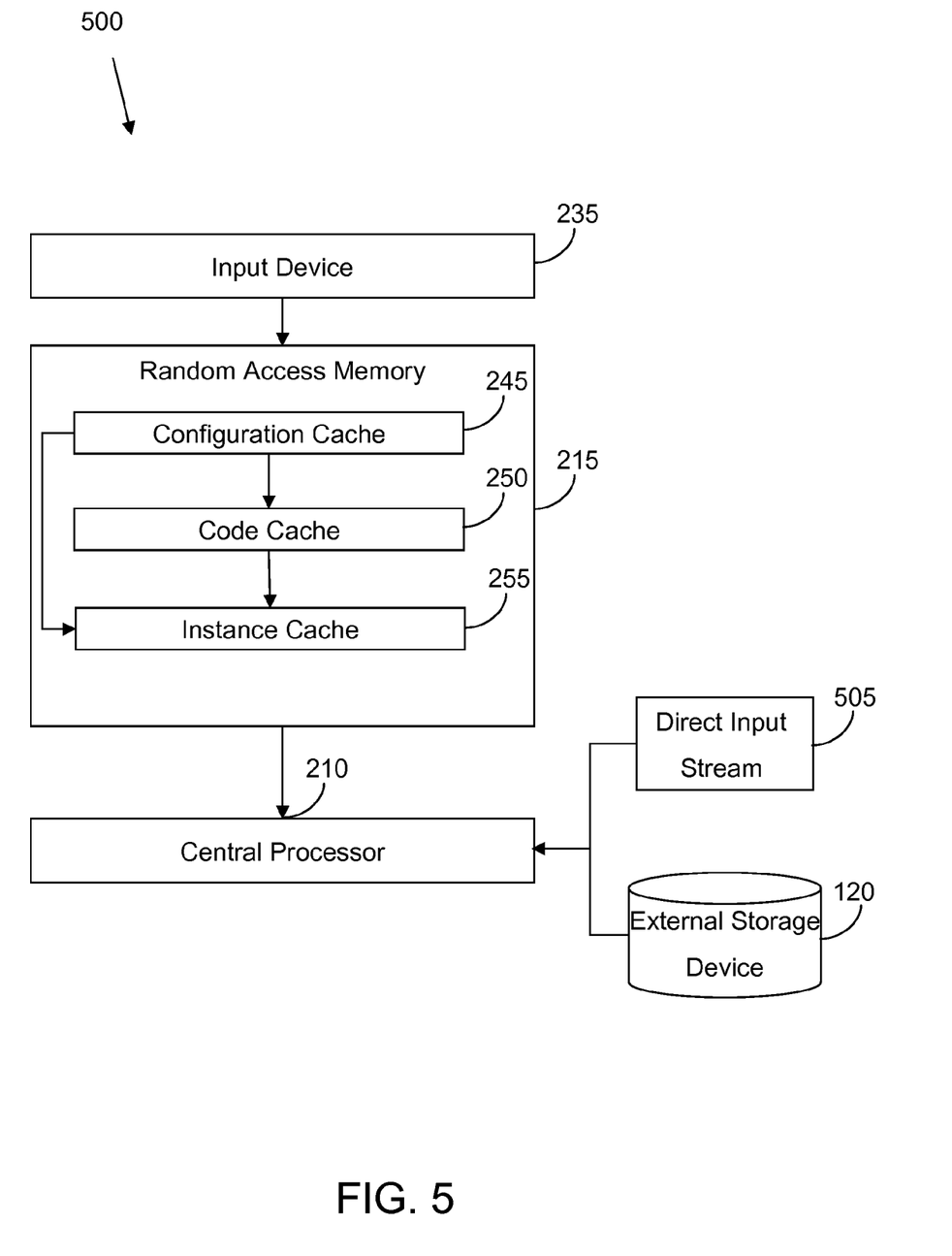
FIG. 5 is a block diagram of an online batch system according to an embodiment of the invention.

FIG. 5 is a block diagram of an online batch system 500 according to an embodiment of the invention. The batch system 500 includes an input device 235, a main memory 215, a configuration cache 245, a code cache 250, an instance cache 255, a central processor 210, a direct input stream 505 and an external storage device 120.

Input device 235 receives a job request through the network 105 from at least one of the device 115*a*, device 115*b* and device 115*n*. As explained earlier the job request includes a job configuration. Further, the job configuration includes a metadata configuration and a runtime configuration. The job configuration from the job request is stored in the configuration cache 245. Similarly, the code corresponding to the metadata configuration is stored in the code cache 250. Further, an instance is identified from the runtime configuration of the job request and stored in the instance cache 255.

The job request includes a stream of data. The stream includes a configuration which includes an identifier to locate data on the external storage device 120. If the stream is called for running on data from the external storage device 120, then the identifier decides from which location the data should be fetched. If the run is on data received from the direct input stream 505, then the stream metadata for the whole data and for processing the data. The data selected by at least one of the direct input stream 505 and external storage device 120, is stored in an in-memory datastructure. The in-memory datastructure is sent to the central processor 210.

The central processor 210 identifies the corresponding job instance from the instance cache 255. The data stored in the in-memory datastructure is processed on the job instance to obtain a result that can be accessed by a user. The result can be serialized on an output stream. In one embodiment, if the data had been retrieved from the external storage device 120 for processing, the result can be stored in the external storage device 120.

The configuration cache 245, the code cache 250, the instance cache 255 may be included in the main memory 215 of the computer system 500.

While exemplary embodiments of the invention have been disclosed, the present disclosure may be practiced in other ways. Various modifications and enhancements may be made without departing from the scope of the present disclosure. The present disclosure is to be limited only by the claims.

What is claimed is:

1. A method for processing data, the method comprising:
receiving a job request from a user, the job request comprises a job configuration and a plurality of operations to process the data;
extracting the job configuration from the job request and storing in a configuration cache;
extracting a metadata configuration code from the job configuration and storing in a code cache;
extracting a runtime configuration code from the job configuration and storing in an instance cache, whereby information can be obtained from the configuration cache, the code cache and the instance cache for processing subsequent job requests with similar job configurations and operations;
fetching the data to be processed from at least one of the job request and an external storage device thereby enabling interoperability between batch execution and online execution;
executing the plurality of operations on the data to generate a result; and
providing the result to the user through at least one of an output stream and the external storage device.

2. The method of claim 1, further comprising:
storing the data in an in-memory datastructure, wherein the in-memory datastructure comprises at least one of a plurality of data and metadata; and
loading the runtime configuration code from the instance cache into the in-memory datastructure.

3. The method of claim 2, wherein executing comprises:
executing the plurality of operations selectively on the data in the in-memory datastructure.

4. The method of claim 2, wherein executing comprises:
executing the plurality of operations on the data in the in-memory datastructure.

5. The method of claim 2, wherein executing comprises:
executing the plurality of operations on metadata in the in-memory datastructure.

6. A method for processing data, the method comprising:
receiving a first job request from a user, the job request comprises a job configuration and a plurality of operations to process the data;
extracting the job configuration from the job request and storing in a configuration cache;
extracting a metadata configuration code from the job configuration and storing in a code cache;
extracting a runtime configuration code from the job configuration and storing in an instance cache;
receiving a second job request from the user, the second job request comprising the same job configuration and plurality of operations as the first job request;
loading the runtime configuration code from the instance cache of the first job request;
fetching the data from at least one of the second job request and an external storage device thereby enabling interoperability between batch execution and online execution;
executing the plurality of operations on the data of the second job request to generate a result; and
providing the result to the user through at least one of an output stream and the external storage device.

7. The method of claim 6 further comprising:
storing the data in an in-memory datastructure, wherein the in-memory datastructure comprises at least one of a plurality of data and metadata.

8. The method of claim 7, wherein executing comprises:
executing the plurality of operations selectively on the data in the in-memory datastructure.

9. The method of claim 7, wherein executing comprises:
executing the plurality of operations on the data in the in-memory datastructure.

10. The method of claim 7, wherein executing comprises:
executing the plurality of operations on metadata in the in-memory datastructure.

11. A computer that runs batch software in an on-line mode, the computer comprising:
a central processor;
a random-access memory including a configuration cache, a code cache and an instance cache;
an input device in communication with the central processor, through which a job request can be communicated to the central processor;
software stored in the random-access memory, operative to cause the central processor to:
extract a metadata configuration and a runtime configuration from the job request and store both configurations in the configuration cache;
extract metadata configuration code from the job request and store said code in the code cache;
extract runtime configuration code from the job request and store said code in the instance cache; and
receive any data in the job request and any data from an external data storage device and process the received data to output data according to code stored in the code and instance caches; and
an output device in communication with the central processor, through which the output data can be communicated to a user.

12. The system of claim 11, wherein the output device serializes and sends the output data on an output stream.

13. The system of claim 11, wherein the output device stores the output data into the external storage device, if the data is selected from the external storage device.

14. A machine-readable medium comprising:
a non-transitory medium for storing computer instructions; and
instructions carried by the medium and operable to cause a programmable central processor to perform:
receiving a job request from a user, the job request comprises a job configuration and a plurality of operations to process the data;
extracting the job configuration from the job request and storing in a configuration cache;
extracting a metadata configuration code from the job configuration and storing in a code cache;
extracting a runtime configuration code from the job configuration and storing in an instance cache, whereby information can be obtained from the configuration cache, the code cache and the instance cache for processing subsequent job requests with the similar job configuration and the plurality of operations;

fetching the data from at least one of the job request and an external storage device, thereby enabling interoperability between batch execution and online execution;

executing the plurality of operations on the data to generate a result; and providing the result to the user through at least one of an output stream and the external storage device.

15. The method of claim 14, further comprising:
storing the data in an in-memory datastructure, wherein the in-memory datastructure comprises at least one of a plurality of data and metadata;
loading the runtime configuration code from the instance cache into the in-memory datastructure.

16. The method of claim 15, wherein executing comprises:
executing the plurality of operations selectively on the data in the in-memory datastructure.

17. The method of claim 15, wherein executing comprises:
executing the plurality of operations on the data in the in-memory datastructure.

18. The method of claim 15, wherein executing comprises:
executing the plurality of operations on metadata in the in-memory datastructure.

* * * * *